(12) United States Patent
Ogawa

(10) Patent No.: US 9,377,372 B2
(45) Date of Patent: Jun. 28, 2016

(54) SMALL-SIZED LOAD SENSOR UNIT

(71) Applicant: MINEBEA CO., LTD., Kitasaku-Gun, Nagano (JP)

(72) Inventor: Satoshi Ogawa, Fujisawa (JP)

(73) Assignee: Minebea Co., Ltd., Nagano (JP)

( * ) Notice: Subject to any disclaimer, the term of this patent is extended or adjusted under 35 U.S.C. 154(b) by 205 days.

(21) Appl. No.: 14/459,575

(22) Filed: Aug. 14, 2014

(65) Prior Publication Data
US 2015/0047439 A1 Feb. 19, 2015

(30) Foreign Application Priority Data

Aug. 19, 2013 (JP) .................................. 2013-169706

(51) Int. Cl.
*G01L 1/26* (2006.01)
*G01L 1/12* (2006.01)
*G01L 1/25* (2006.01)
*G01L 25/00* (2006.01)
*G01L 1/00* (2006.01)
*G01L 1/22* (2006.01)

(52) U.S. Cl.
CPC ................. *G01L 1/26* (2013.01); *G01L 1/2206* (2013.01)

(58) Field of Classification Search
None
See application file for complete search history.

(56) References Cited

U.S. PATENT DOCUMENTS

| 5,144,843 | A * | 9/1992 | Tamura | G01L 9/0042 338/4 |
| 6,591,688 | B2 * | 7/2003 | Wright | G01F 23/18 73/715 |
| 6,640,650 | B2 | 11/2003 | Matsuzawa et al. | |
| 7,055,365 | B2 * | 6/2006 | Yanagi | B60N 2/002 177/211 |
| 7,155,981 | B2 * | 1/2007 | Matsuura | G01L 1/2206 73/781 |
| 7,189,931 | B2 * | 3/2007 | Hida | B60N 2/002 177/144 |
| 7,509,871 | B2 * | 3/2009 | Nakano | B60N 2/002 73/781 |
| 7,538,281 | B2 * | 5/2009 | Pottebaum | G01G 19/12 177/211 |
| 8,212,157 | B2 * | 7/2012 | Ito | G01G 19/4142 177/136 |

FOREIGN PATENT DOCUMENTS

| JP | 2002-054984 A | 2/2002 |
| JP | 2003-337053 A | 11/2003 |

* cited by examiner

*Primary Examiner* — Peter Macchiarolo
*Assistant Examiner* — Jermaine Jenkins
(74) *Attorney, Agent, or Firm* — Carrier Blackman & Associates, P.C.; Joseph P. Carrier; William D. Blackman

(57) ABSTRACT

A small-sized load sensor unit including a pressure member, to which a pressing force is applied, a strain body which is fixed to the pressure member by a first fixing member, a strain measuring unit which is provided on the strain body and is configured to be deformed together with the strain body, a first restricting unit which restricts a pressing force applied to a substantially center portion of the pressure member such that the pressing force becomes a predetermined threshold value or less, and a second restricting unit which restricts the pressure member from moving by a predetermined amount or more when a pressing force of an excessive load is applied to an edge portion of the pressure member.

9 Claims, 16 Drawing Sheets

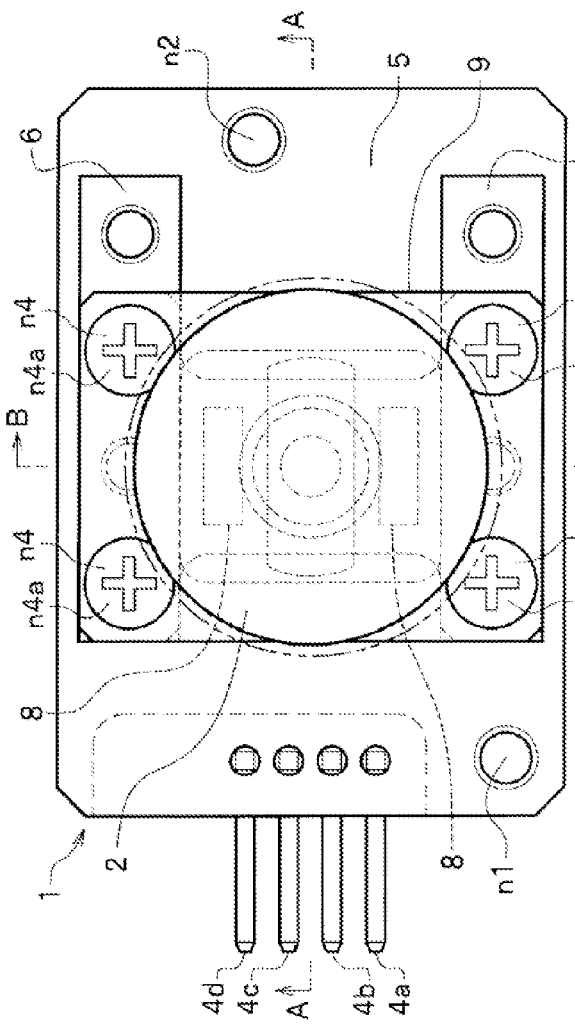
FIG.2A
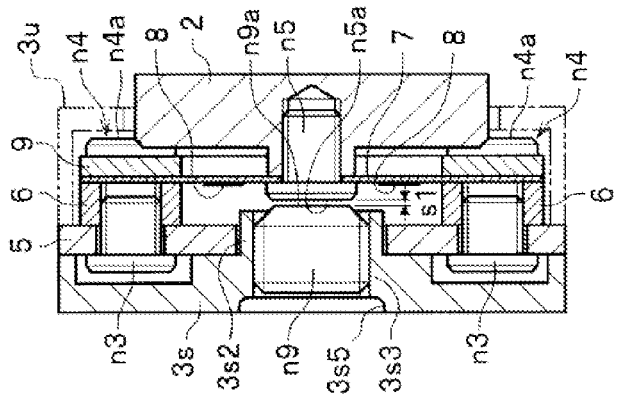
FIG.2C
FIG.2B

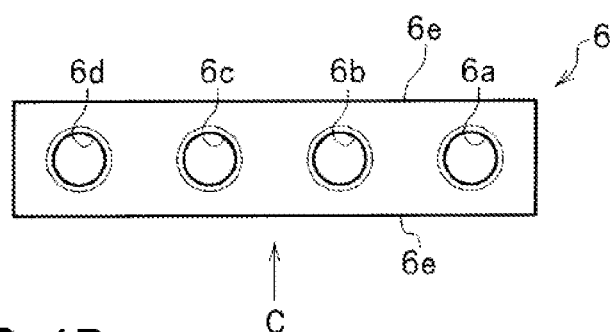
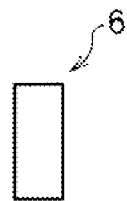
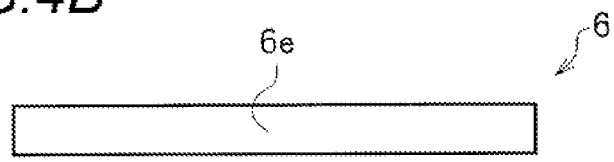
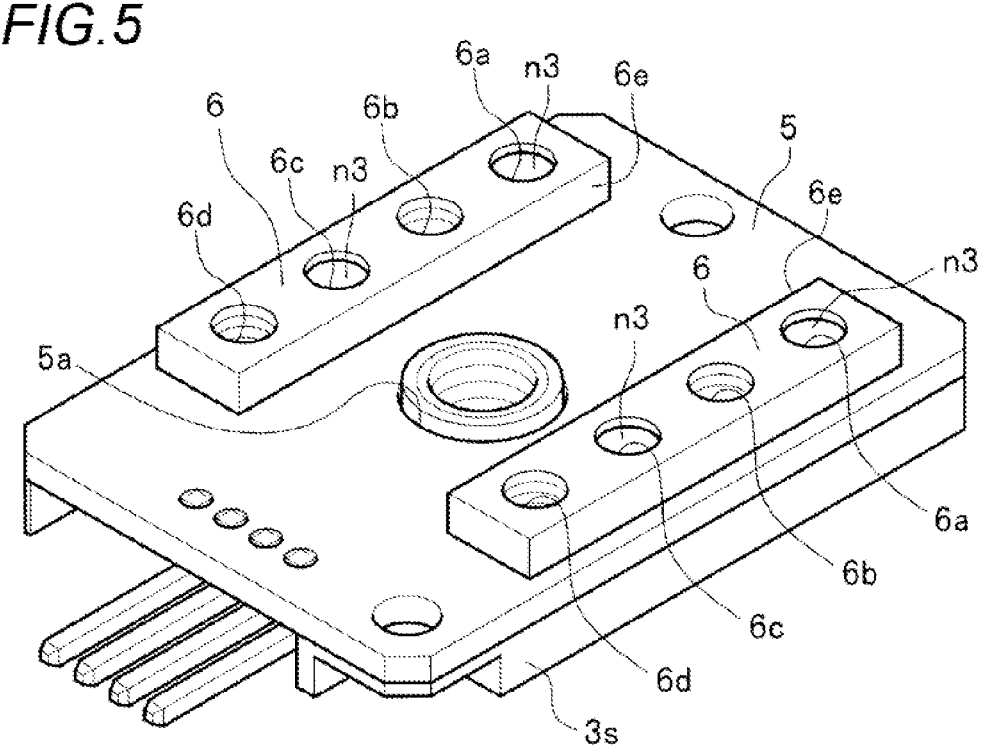

*FIG.8A*                  *FIG.8C*
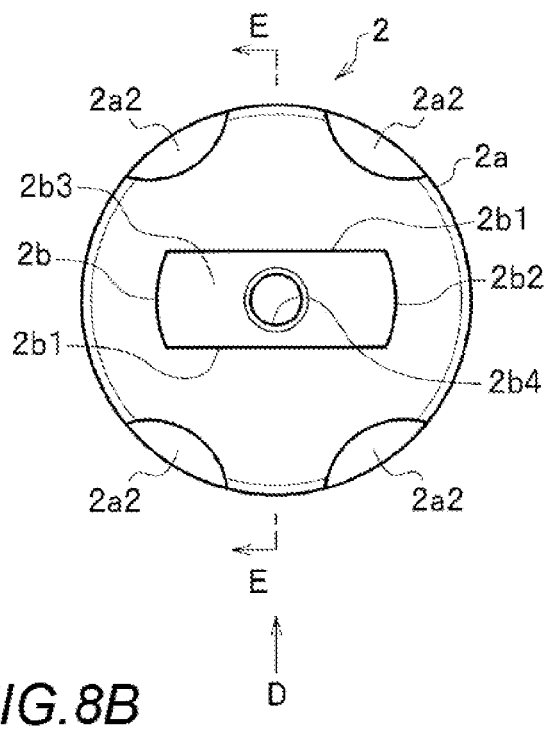
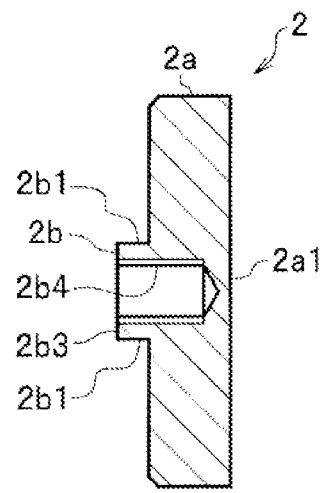
*FIG.8B*
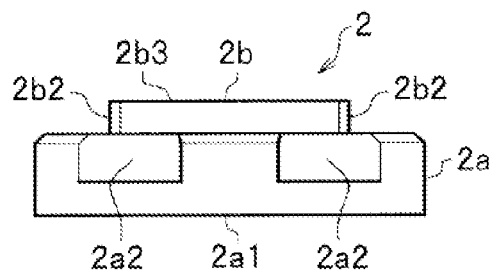

SMALL-SIZED LOAD SENSOR UNIT

CROSS-REFERENCE TO RELATED APPLICATION

This application claims priority from Japanese Patent Application No. 2013-169706, filed on Aug. 19, 2013, the entire subject matter of which is incorporated herein by reference.

BACKGROUND OF THE INVENTION

1. Field of the Invention

The present invention relates to a small-sized load sensor unit which detects a magnitude of a load, and more particularly, to a small-sized load sensor unit which is small and lightweight and can be easily assembled to an apparatus, and which has excellent responsiveness to load variation and has high reliability by including a mechanism for preventing breakage of a part of detecting a load even when a load equal to or larger than a predetermined value is applied.

2. Description of the Related Art

JP-A-2002-54984 discloses a load sensor unit including a strain body deformed according to a magnitude of a load, a strain measuring unit, and a mechanism for restricting a displacement amount of the strain body according to the magnitude of the load such that the breakage of the strain body and the strain measuring unit can be prevented. For example, there is disclosed a scale which measures a load of an object placed on a tray. The scale includes a stopper mechanism which prevents deformation of a strain body when unexpected stress is applied to the strain body due to lifting of the tray, an excessive load or falling. Specifically, the scale includes a tray receiving plate which connects the strain body and the tray, a strain body holder which connects the strain body and a base portion, and a stopper mechanism in which a part of the tray receiving plate and a part of the strain body holder are fit thereto, and when a stress equal to or larger than a predetermined value is applied, the fit parts come into contact with each other, so that the strain body is not deformed further.

JP-A-2003-337053 discloses a flow sensor which measures a flow of a fluid. The flow sensor includes a displacement restricting member for diaphragms or a load difference sensor. When the load difference sensor detects a displacement due to variation in a fluid pressure on the diaphragms connected through an orifice, the displacement restricting member operates such that the displacement due to variation in the fluid pressure on the diaphragms does not become a predetermined amount or more.

That is, an apparatus and a strain body appropriate for an object to be measured or diaphragms and a manner of restricting the displacement amount of the strain body or the diaphragms may be designed at each time in performing weight measurement using a scale or flow measurement using a flow sensor, so that small-sized load sensor units each having an unique structure may be obtained. However, in this case, it takes a long time to evaluate a small-sized load sensor unit and an apparatus with the small-sized load sensor unit assembled therein. Therefore, it is difficult to develop an apparatus in a shorter time and implement earlier manufacture and sales. Also, it is burdensome to design a strain body according to a method of sensing a load and to spend a lot of time for experiments, evaluations, or the like at each time.

Further, if it is required to measure a load at high resolution or a minuscule differential pressure of a flow in detecting the displacement of a strain body or diaphragms by a strain measuring unit, it is necessary to improve the sensitivity of a sensor (strain measuring unit). That is, it is necessary to reduce the thickness of the strain body or diaphragms, thereby increasing a displacement amount, and to perform design change such as adjustment of a breakage preventing mechanism. Furthermore, there are burdens such as selection or design of a strain body according to a magnitude of a flow or a load, or a strain measuring unit according to the displacement amount of diaphragms.

SUMMARY OF THE INVENTION

The present invention has been made in view of the above circumstances, and an object of the present invention is to provide a small-sized load sensor unit which is small and lightweight and can be easily assembled to an apparatus, and which has excellent responsiveness to load variation and has high reliability by including a mechanism for preventing breakage of a part of detecting a load even when a load equal to or larger than a predetermined value is applied.

According to an illustrative embodiment of the present invention, there is provided a small-sized load sensor unit including: a pressure member, to which a pressing force is applied; a strain body which is fixed to the pressure member by a first fixing member; a strain measuring unit which is provided on the strain body and is configured to be deformed together with the strain body when the pressing force is applied, and which is configured to measure a magnitude of the pressing force based on a deformation amount of the strain measuring unit; an amplifying unit which is configured to amplify an output of the strain measuring unit; a first restricting unit which is configured to restrict a pressing force applied to a substantially center portion of the pressure member such that the pressing force becomes a predetermined threshold value or less; and a second restricting unit which is configured to restrict the pressure member from moving by a predetermined amount or more when a pressing force of an excessive load is applied to an edge portion of the pressure member.

According to the above configuration, the small-sized load sensor unit includes the amplifying unit configured to amplify the output of the strain measuring unit, the first restricting unit, and the second restricting unit. Therefore, the small-sized load sensor unit has excellent responsiveness to load variation, and can restrict an excessive load by the first restricting unit or the second restricting unit when an excessive load is applied to the center portion or the edge portion of the pressure member, thereby preventing damage or breakage of the small-sized load sensor unit.

In the above small-sized load sensor unit, a distance between the first restricting unit and the pressure member may be adjusted such that when a pressing force exceeding the predetermined threshold value is applied to the pressure member, the first fixing member comes into contact with the first restricting unit so as to restrict the pressing force.

According to the above configuration, the distance between the first restricting unit and the pressure member can be adjusted. Therefore, it is possible to adjust the length of the whole stroke of the pressure member.

In the above small-sized load sensor unit, the second restricting unit may be provided on the strain body at a side where the pressure member is provided, and the portion of the pressure member may be configured to come into contact with the second restricting unit so as to restrict the pressure member from moving by the predetermined amount or more.

According to the above configuration, it is possible to restrict the pressure member from moving by the predetermined amount or more when an unbalanced load is applied to the pressure member.

In the above small-sized load sensor unit, the pressure member may have a cylindrical portion and a cuboidal boss portion, the cuboidal boss portion may have a pair of linear edge portions and a pair of curved edge portions, the strain body may be in contact with the cuboidal boss portion and be fixed to the pressure member by the first fixing member, and the strain measuring unit may be provided at an outer side of the linear edge portions of the cuboidal boss portion.

According to the above configuration, the strain body is deformable at the state of simple bending with fixed ends thereof. Therefore, the strain measuring unit can accurately measure a pressing force applied to the pressure member.

In the above small-sized load sensor unit, both end portions of the strain body may be fixed by fixing portions, respectively.

According to the above configuration, the strain body is deformable at the state of simple bending with fixed ends thereof. Therefore, the strain measuring unit can accurately measure the pressing force applied to the pressure member.

In the above small-sized load sensor unit, a distance between wide end edges of wide portions of the strain body may be equal to or larger than a distance between inner end edges of the second restricting unit.

According to the above configuration, the portion of the strain body having the strain measuring unit disposed therein can be deformed into same shape in a simple bending state. Therefore, it is possible to accurately measure the pressing force applied to the pressure member.

In the above small-sized load sensor unit, a bottom of the cuboidal boss portion may have an area equal to or larger than an area facing to contact with the strain body in the cuboidal boss portion.

According to the above configuration, it is possible to fix both end portions of the strain body with uniform strength. Therefore, it is possible to accurately measure the pressing force applied to the pressure member.

The above small-sized load sensor unit may further comprise: an upper case and a lower case configure an external appearance; and a base plate which includes a wiring line for connecting to the strain measuring unit. At least one member among the upper case, the lower case, and the pressure member may be formed of a metal, the base plate may be formed with an earth wiring pattern for the at least one member formed of the metal, and the at least one member formed of the metal and the earth wiring pattern formed on the base plate may be electrically connected to each other by contact with a second fixing member which has electrical conductivity.

According to the above configuration, at least one member of the upper case, the lower case, and the pressure member is formed of a metal. Therefore, it is possible to enhance the strength of the small-sized load sensor unit, and improve the mechanical reliability of the small-sized load sensor unit.

Also, since the member formed of the metal and the earth wiring pattern formed on the base plate can be electrically connected to each other, by contact with the second fixing member which has electrical conductivity, it is unnecessary to separately provide a wiring line for the earth. Therefore, it is possible to reduce not only the product cost but also the assembling cost.

In the above small-sized load sensor unit, the strain measuring unit may include a strain gauge.

According to the above described configuration, it is possible to use the strain gauge to measure the pressing force applied to the pressure member.

According to the above configuration, it is possible to implement a small-sized load sensor unit which is small and lightweight and can be easily assembled to an apparatus, and which has excellent responsiveness to load variation and has high reliability by a mechanism for preventing breakage of a part of detecting a load even when a load equal to or larger than a predetermined value is applied.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 2A is a top plan view showing the small-sized load sensor unit where a cover is removed, FIG. 2B is a cross-sectional view taken along a line A-A of FIG. 2A, and FIG. 2C is a cross-sectional view taken along a line B-B of FIG. 2A;

FIG. 4A is a top plan view showing a spacer, FIG. 4B is a view showing the spacer as seen in the direction of an arrow C of FIG. 4A, and FIG. 4C is a right side view showing the spacer;

FIG. 5 is a perspective view showing a state where the spacers are fixed to a base plate;

FIG. 8A is a bottom view showing a load button, FIG. 8B is a view showing the load button as seen in the direction of an arrow D of FIG. 8A, and FIG. 8C is a cross-sectional view taken along a line E-E of FIG. 8A;

DETAILED DESCRIPTION

Hereinafter, an illustrative embodiment of the present invention will be described with reference to the accompanying drawings.

Figure 1A:
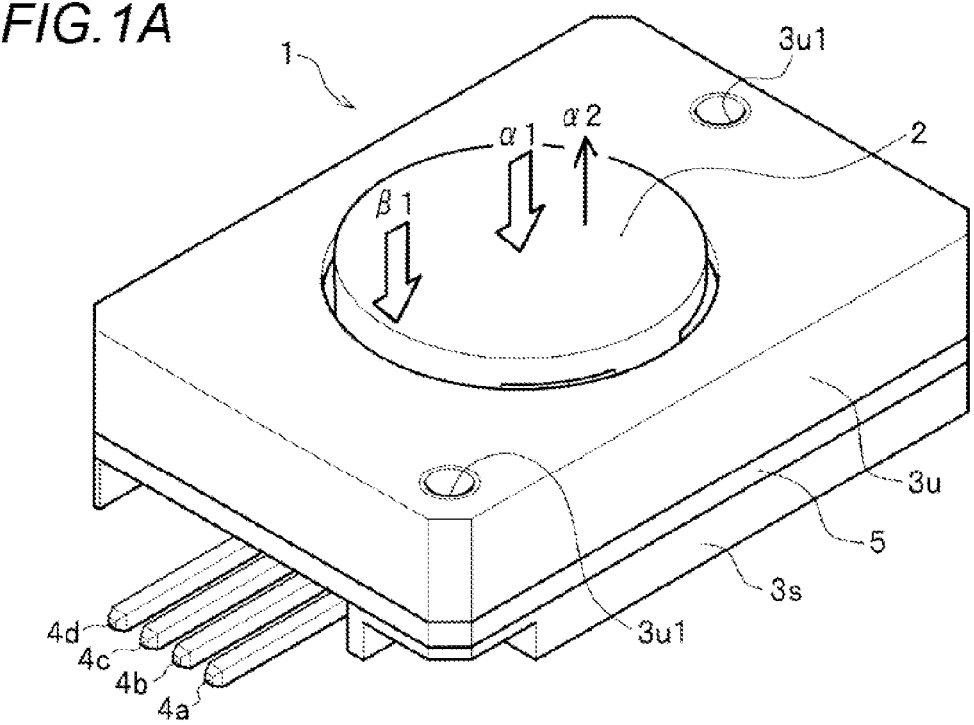
FIG. 1A is a top perspective view showing a small-sized load sensor unit according to an illustrative embodiment of the present invention.
Figure 1B:
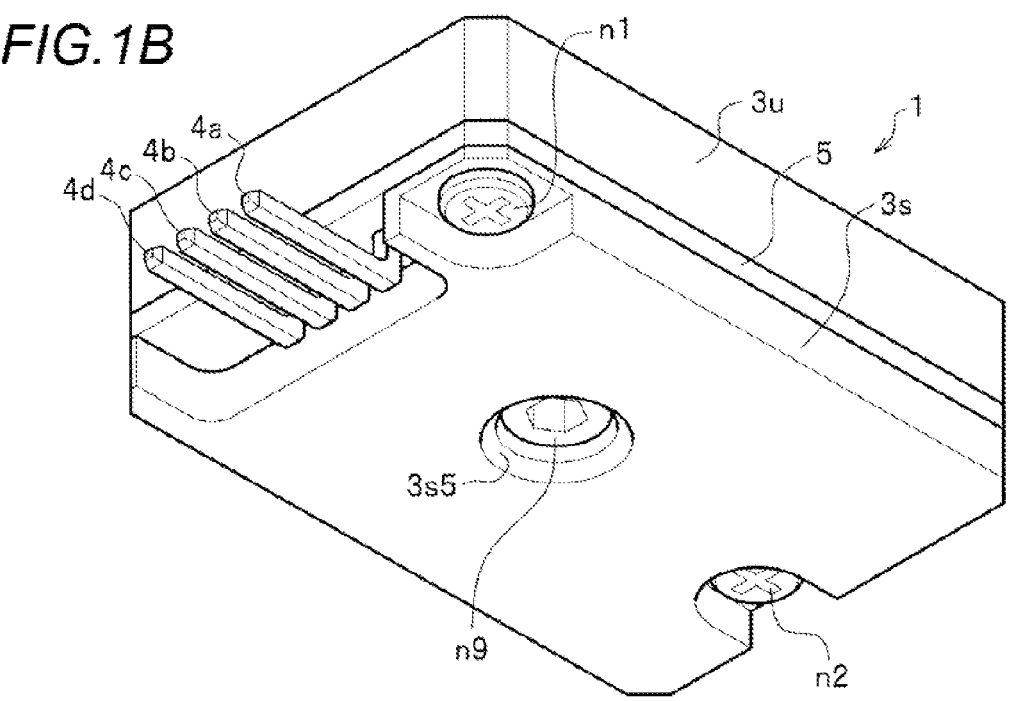
FIG. 1B is a bottom perspective view showing the small-sized load sensor unit according to the illustrative embodiment.

FIG. 1A is a top perspective view showing a small-sized load sensor unit 1 according to an illustrative embodiment of the present invention, and FIG. 1B is a bottom perspective view showing the small-sized load sensor unit 1 according to the illustrative embodiment.

FIG. 2A is a top plan view showing the small-sized load sensor unit 1 where a cover 3u is removed, FIG. 2B is a cross-sectional view taken along a line A-A of FIG. 2A, and FIG. 2C is a cross-sectional view taken along a line B-B of FIG. 2A.

Figure 3:
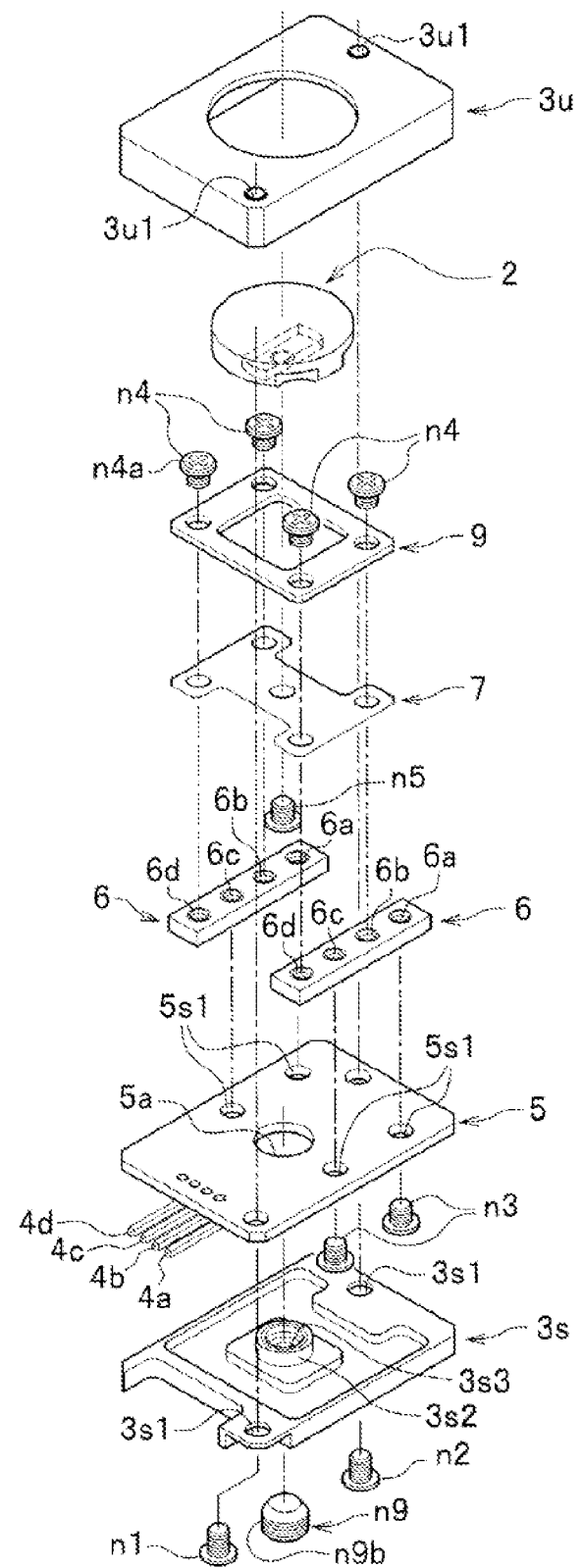
FIG. 3 is an exploded perspective view showing the small-sized load sensor unit according to the illustrative embodiment.

FIG. 3 is an exploded perspective view showing the small-sized load sensor unit 1 according to the illustrative embodiment.

The small-sized load sensor unit 1 (see FIGS. 1A and 1B) according to an illustrative embodiment is a unit for measuring a pressing force (see an arrow α1 of FIG. 1A) applied to a center portion of a load button 2.

The small-sized load sensor unit 1 has a configuration for preventing breakage of the small-sized load sensor unit 1 when the pressing force (see the arrow α1 of FIG. 1A) applied to the center portion of the load button 2, or a pressing force (see an arrow β1 of FIG. 1A) applied to an edge portion of the load button 2 is an excessive load.

In the small-sized load sensor unit 1, the load button 2 for receiving a load at a top center thereof protrudes upward and is elastically supported by a strain body 7 (described below) (see FIGS. 2B and 2C). The load button 2 is supported such that if a load is applied as shown by the arrow α1 of FIG. 1, the load button 2 moves into the small-sized load sensor unit 1, and when no load is applied, the load button 2 is positioned at an original position thereof (the position of FIG. 1A) by an elastic force. That is, if the load applied as shown by the arrow α1 is removed, the load button 2 returns to the original position, as shown by an arrow α2, by the elasticity of the strain body 7.

The small-sized load sensor unit 1 is covered with the cover 3u and a support plate 3s, which are an upper case and a lower case, respectively, and form the external appearance of the unit. The cover 3u and the support plate 3s are fixed by round head screws n1 and n2 from below the support plate 3s. Specifically, as shown in FIG. 3, the round head screws n1 and n2 are inserted from below the support plate 3s into insertion holes 3s1 of the support plate 3s, respectively, and are screwed into female screws 3u1 formed in the cover 3u which is the upper case, so that the support plate 3s and the cover 3u are fixed.

Each of the cover 3u and the support plate 3s is made of a resin such as acrylonitrile-butadiene-styrene (ABS) or polyoxymethylene (POM).

At the center portion of the support plate 3s, a boss 3s2 is formed to protrude inward and have a female screw 3s3 formed by a tap.

The small-sized load sensor unit 1 has four external connection terminals 4a, 4b, 4c, and 4d formed to protrude outward. The external connection terminal 4a is a power supply terminal, and the external connection terminal 4b is an output terminal. The external connection terminal 4c is a ground (GND) terminal, and the external connection terminal 4d is an earth terminal. Output of the small-sized load sensor unit 1 is amplified by an amplifying unit, and is obtained by a difference between output of the external connection terminal 4b and output of the external connection terminal 4c which is the ground (GND) terminal.

As shown in FIG. 2A to 2C, in the small-sized load sensor unit 1, a rectangular base plate 5 having a wiring pattern formed thereon is sandwiched and fixed between the cover 3u which is the upper case and the support plate 3s which is the lower case. The base plate 5 is formed using an epoxy resin or the like. At the center portion of the base plate 5, an attachment/insertion hole 5a (see FIG. 3) for inserting the boss 3s2 of the support plate 3s is formed.

On a pattern formed in advance on the base plate 5, an operational amplifier which is the amplifying unit, resistors, capacitors, and the like (not shown) are mounted. Further, strain gauges 8 mounted on the strain body 7, and the four external connection terminals 4a, 4b, 4c, and 4d are electrically connected to each other through the base plate 5.

<Spacer 6>

FIG. 4A is a top plan view showing a spacer 6, FIG. 4B is a view showing the spacer 6 as seen in the direction of an arrow C of FIG. 4A, and FIG. 4C is a right side view showing the spacer 6.

Each spacer 6 is formed of a metal such as stainless steel (SUS) or aluminum in a long cuboidal shape. In each spacer 6, four female screws 6a, 6b, 6c, and 6d are formed. The female screws 6a and 6c are formed from below by a tap, and the female screws 6b and 6d are formed from above by a tap.

As shown in FIG. 3, a pair of spacers 6 are fixed by inserting round head screws n3 into insertion holes 5s1 of the base plate 5 from below the base plate 5 and screwing the round head screws n3 into the female screws 6a and 6c of the spacers 6. In this way, the pair of spacers 6 is fixed on the base plate 5 as shown in FIG. 5. FIG. 5 is a perspective view showing a state where the spacers 6 are fixed on the base plate 5.

As shown in FIG. 3, the strain body 7 and a stopper plate 9 are stacked on the spacers 6 fixed on the base plate 5, and round head screws n4 are screwed into the female screws 6b and 6d, so that the strain body 7 and the stopper plate 9 are fixed.

<Strain Body 7>

Figure 6A:
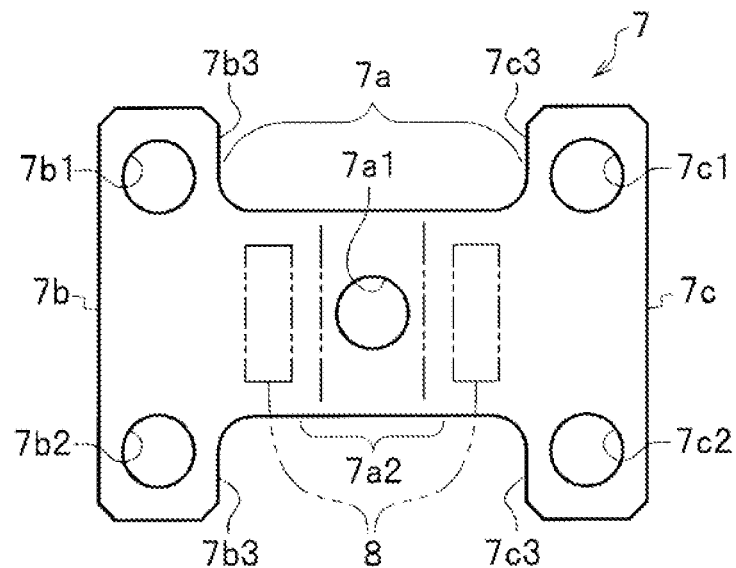
FIG. 6A is a plan view showing a strain body.
Figure 6B:
FIG. 6B is a right side view showing the strain body of FIG. 6A.

FIG. 6A is a plan view showing the strain body 7, and FIG. 6B is a right side view showing the strain body 7 of FIG. 6A.

The strain body 7 is a thin plate formed of a metal such as stainless steel, substantially in an H shape.

At the center portion of the strain body 7, a narrow portion 7a is formed, and at both end portions of the strain body 7, wide portions 7b and 7c are formed to be connected to end portions of the narrow portion 7a.

At the center portion of the narrow portion 7a of the strain body 7, an insertion hole 7a1 is formed for inserting a round head screw n5 (see FIG. 3) in order to fix the strain body 7 to the load button 2.

On both side portions in the narrow portion 7a of the strain body 7, the strain gauges 8 (portions shown by alternate long and two short dashes lines in FIG. 6A) are mounted for measuring the deformation amount of the strain body 7 when the pressing force (the arrow α1 of FIG. 1) is applied to deform the strain body 7.

In the wide portion 7b of the strain body 7, insertion holes 7b1 and 7b2 are formed by press working, such that the round head screws n4 (see FIG. 3) can be inserted from above for fixing the wide portion 7b to one spacer 6.

Similarly, in the wide portion 7c of the strain body 7, insertion holes 7c1 and 7c2 are formed by press working, such that the round head screws n4 (see FIG. 3) can be inserted from above for fixing the wide portion 7c to the other spacer 6.

<Stopper Plate 9>

Figure 7A:
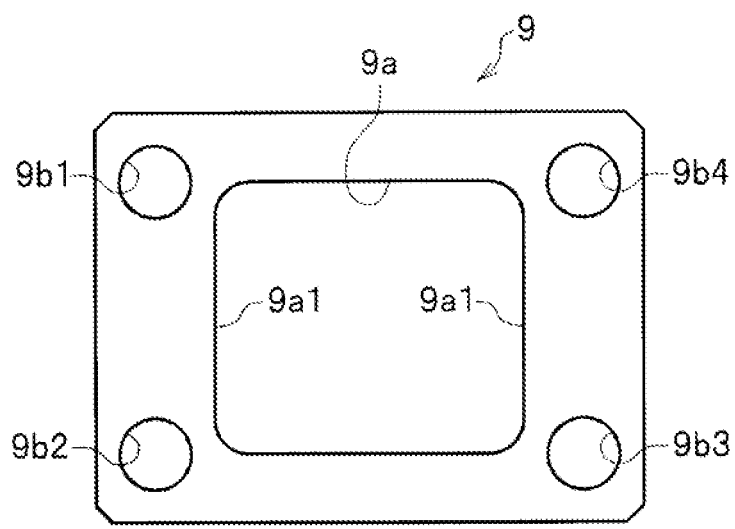
FIG. 7A is a plan view showing a stopper plate.
Figure 7B:
FIG. 7B is a right side view showing the stopper plate of FIG. 7A.

FIG. 7A is a plan view showing the stopper plate 9, and FIG. 7B is a right side view showing the stopper plate 9 of FIG. 7A.

The stopper plate 9 is a member which serves as a stopper when the pressing force of an excessive load is applied to an edge portion of the load button 2.

The stopper plate 9 is a thin plate formed of stainless steel (SUS) or the like in a rectangular shape having an opening 9a formed at the center for accommodating a portion of the load button 2.

At four corner portions of the stopper plate 9, insertion holes 9b1, 9b2, 9b3, and 964 are formed by press working, such that the screws n4 (see FIG. 3) can be inserted from above.

<Attachment of Load Button 2 to Strain Body 7>

As shown in FIG. 2B, on the strain body 7 fixed together with the stopper plate 9 to the spacers 6, the load button 2 is fixed.

FIG. 8A is a bottom view showing the load button 2, FIG. 8B is a view showing the load button 2 as seen in the direction of an arrow D of FIG. 8A, and FIG. 8C is a cross-sectional view taken along a line E-E of FIG. 8A.

The load button 2 is formed of a resin such as acrylonitrile-butadiene-styrene (ABS) or polyoxymethylene (POM), in a short-length circular cylinder shape.

The load button 2 has a cylindrical portion 2a having a top surface 2a1 for receiving a pressing force (see the arrows α1 and β1 of FIG. 1A), and a cuboidal boss portion 2b where the strain body 7 is fixed.

At a lower portion of the cylindrical portion 2a of the load button 2, four clearance grooves 2a2 are formed for preventing contact with screw heads n4a (see FIG. 3) of the round head screws n4.

The cuboidal boss portion 2b of the load button 2 is formed, for example, by cutting a cylindrical portion 2b2 having a diameter smaller than that of the cylindrical portion 2a such that end edges 2b1 are formed in parallel to each other. In a bottom surface 2b3 of the cuboidal boss portion 2b, a female screw 2b4 for fixing the strain body 7 by the round head screw n5 (see FIG. 3) is formed by a tap.

In order to attach the load button 2 to the strain body 7, an attachment portion 7a2 (see FIG. 6A) between the strain gauges 8 of the narrow portion 7a of the strain body 7 is set to be substantially perpendicular (exactly perpendicular or almost perpendicular) to the bottom surface 2b3 of the cuboidal boss portion 2b of the load button 2.

Thereafter, the round head screw n5 (see FIG. 3) is inserted into the insertion hole 7a1 (see FIG. 6A) of the narrow portion 7a of the strain body 7, and is screwed into the female screw 2b4 of the cuboidal boss portion 2b of the load button 2, so that the load button 2 is attached to the strain body 7.

Figure 9:
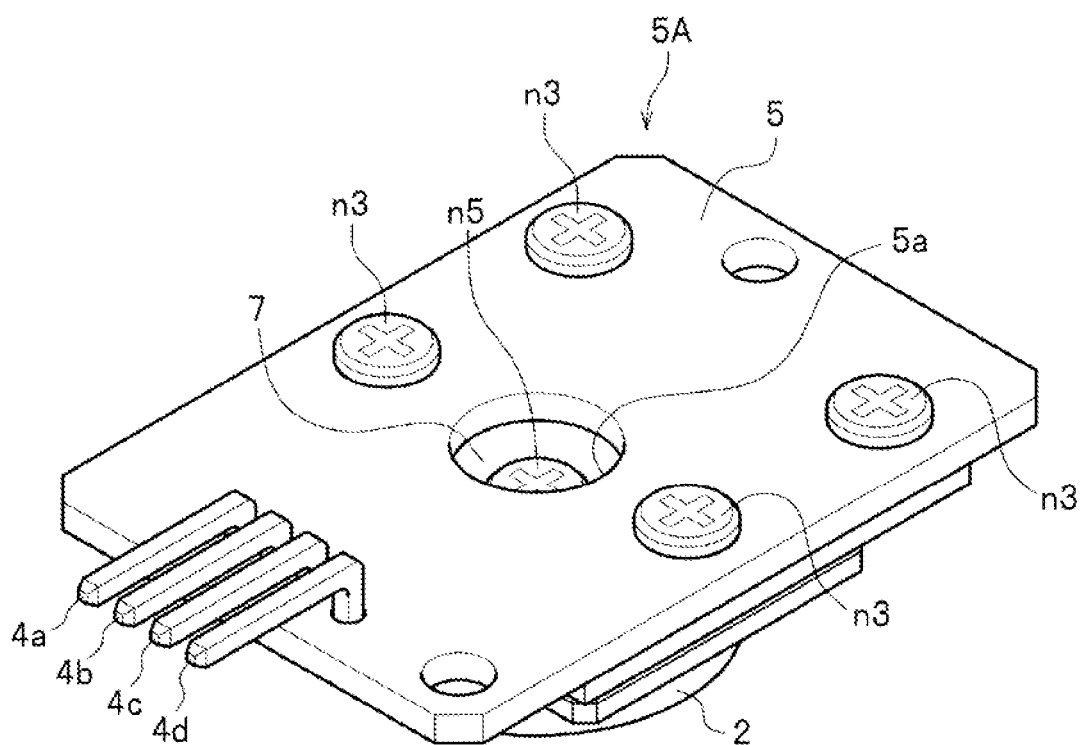
FIG. 9 is a bottom perspective view showing a base plate assembly which has the base plate attached with the spacers and the load button.

FIG. 9 is a bottom perspective view showing a base plate assembly 5A which has the base plate 5 attached with the spacers 6 and the load button 2.

The base plate assembly 5A is turned over, and is covered with the cover 3u and the support plate 3s, which are the upper case and the lower case, respectively, from above and below, as shown in FIG. 3. Thereafter, the round head screws n1 and n2 are inserted into the insertion holes 3s of the support plate 3s, respectively, from below the support plate 3s, and are screwed into the female screws 3u1 of the cover 3u. In this way, the small-sized load sensor unit 1 of FIG. 1A is configured.

Further, as shown in FIG. 2B, a setscrew n9 having an adhesive applied to a screw portion n9b (see FIG. 3) is screwed into the female screw 3s3 of the boss 3s2 of the support plate 3s from below the support plate 3s, whereby a distance s1 between a front end edge n9a of the setscrew n9 and a screw head n5a of the round head screw n5 which is the whole stroke of the load button 2 is adjusted to a predetermined distance. Thereafter, the adhesive applied on the setscrew n9 is cured as time goes on, so that the setscrew n9 is fixed to the female screw 3s3 of the boss 3s2 of the support plate 3s.

<Method of Fixing Strain Body 7>

Figure 10:
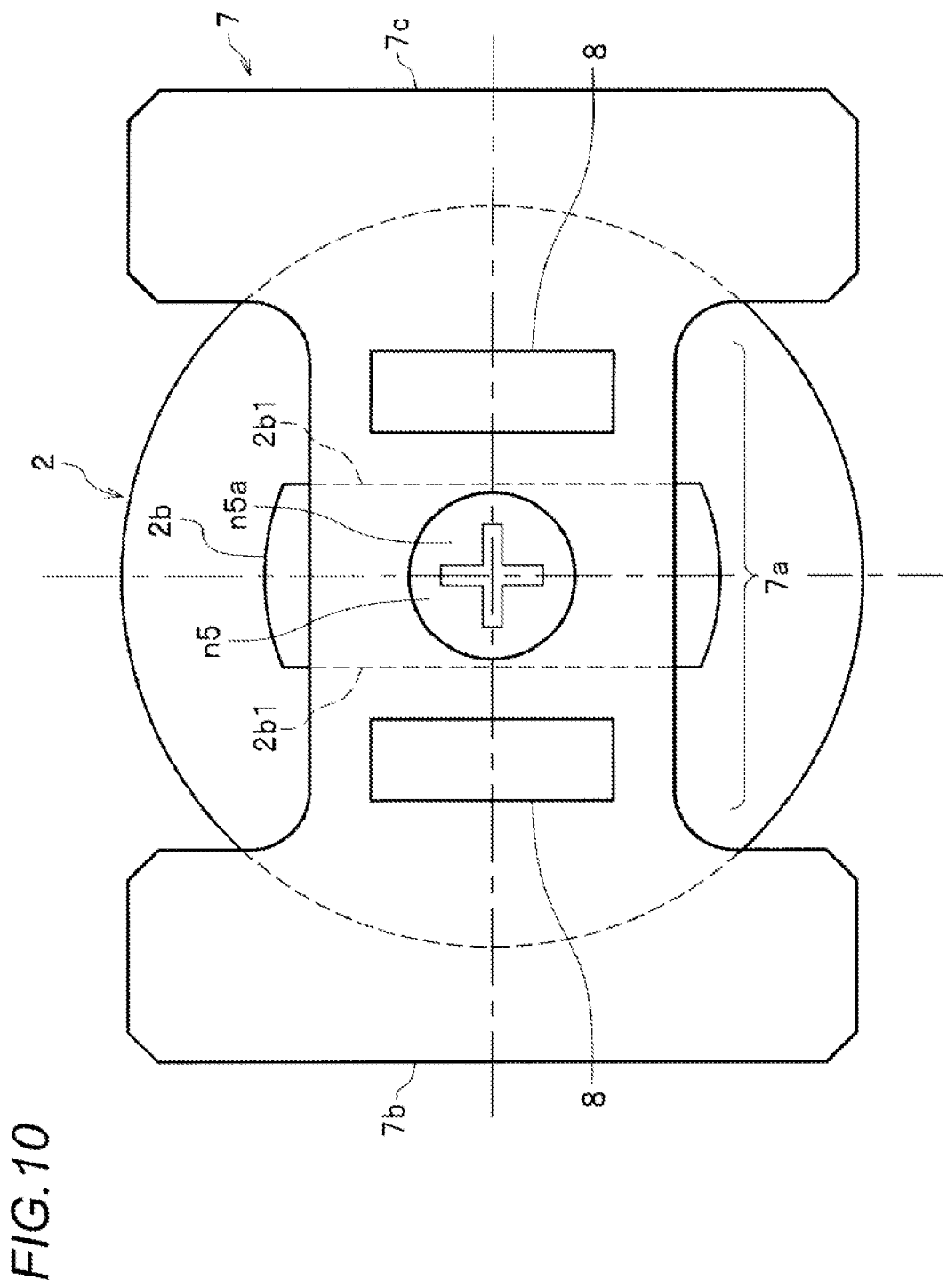
FIG. 10 is a bottom view showing the strain body having the load button attached thereto.

FIG. 10 is a bottom view showing the strain body 7 having the load button 2 attached thereto. In order to attach the load button 2 to the strain body 7, the round head screw n5 is inserted into the insertion hole 7a1 (see FIG. 6A) of the strain body 7 from below the strain body 7, and is screwed into the female screw 2b4 (see FIG. 8A) of the center of the bottom surface side of the load button 2, whereby the load button 2 is attached to the strain body 7.

The pair of parallel end edges 2b1 of the cuboidal boss portion 2b of the load button 2 is disposed so as to be substantially perpendicular (exactly perpendicular or almost perpendicular) to an extension direction of the narrow portion 7a of the strain body 7. In this case, the strain gauges 8 (portions shown by alternate long and two short dashes lines in FIG. 6A) mounted on the narrow portion 7a are positioned on the outer sides of the cuboidal boss portion 2b of the load button 2.

Figure 11A:
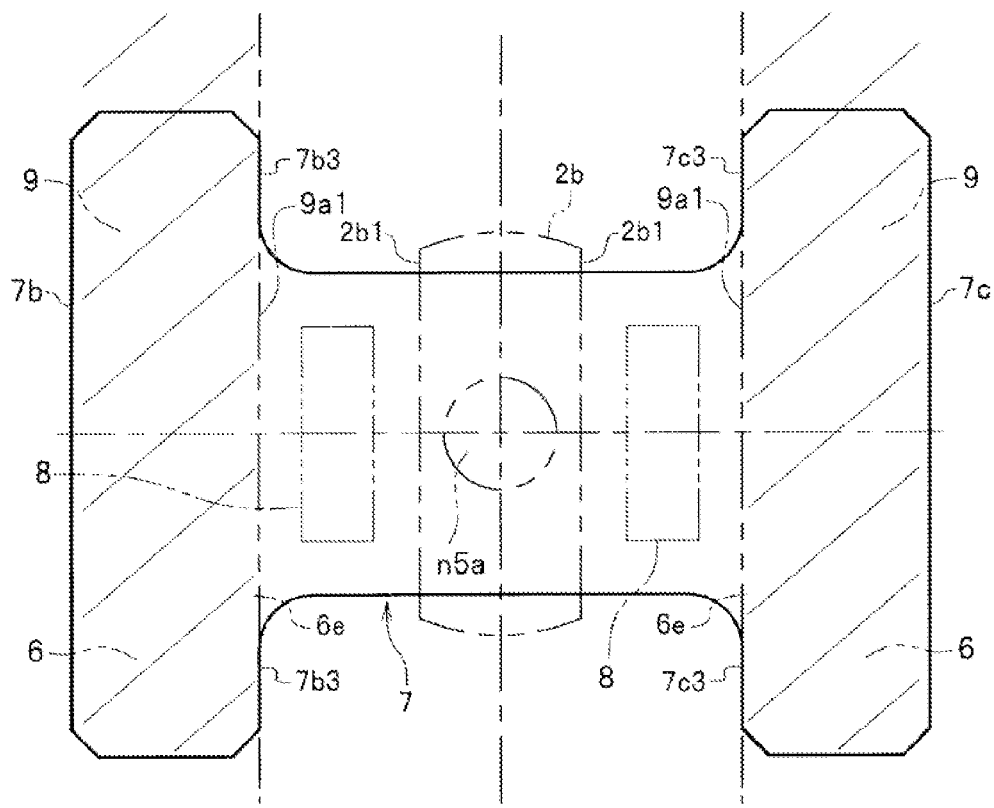
FIG. 11A is a bottom view showing the strain body in the fixed state of the strain body.
Figure 11B:
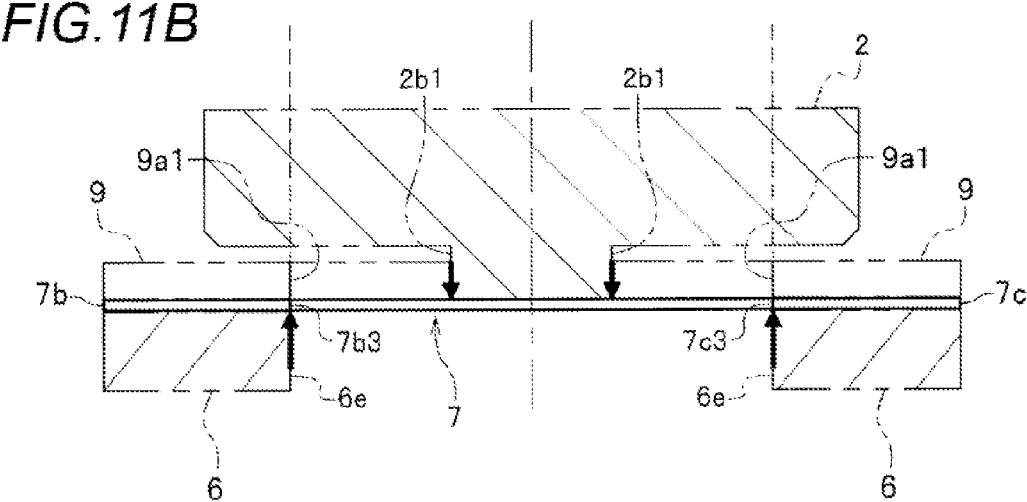
FIG. 11B is a conceptual side view showing upward and downward loads which the strain body of FIG. 11A receives when a pressing force is applied to the load button.

FIG. 11A is a bottom view showing the strain body 7 in the fixed state of the strain body 7, and FIG. 11B is a conceptual side view showing upward and downward loads, which the strain body 7 of FIG. 11A receives when a pressing force is applied to the load button 2, by thick line arrows. In FIGS. 11A and 11B, only the strain body 7 is shown by a solid line, and the load button 2, the stopper plate 9, the strain gauges 8, and the spacers 6 are shown by alternate long and two short dashes lines (virtual lines).

As described above, on the center portion of the narrow portion 7a of the strain body 7, the cuboidal boss portion 2b of the load button 2 is fixed.

The bottom surface side of the wide portion 76 of one end of the strain body 7 is in contact with one spacer 6, and the top surface side thereof is in contact with the stopper plate 9, so that the wide portion 7b is sandwiched and fixed by the spacer 6 and the stopper plate 9.

Also, the bottom surface side of the wide portion 7c of the other end of the strain body 7 is in contact with the other spacer 6, and the top surface side thereof is in contact with the stopper plate 9, so that the wide portion 7c is sandwiched and fixed by the spacer 6 and the stopper plate 9.

In this case, it is preferable that a wide end edge 7b3 of the wide portion 7b at one end of the strain body 7 and a longitudinal end edge 6e of the spacer 6 be aligned in a vertical direction, and the wide end edge 7b3 of the wide portion 7b and an inner end edge 9a1 of the stopper plate 9 be aligned in the vertical direction.

Also, it is preferable that a wide end edge 7c3 of the wide portion 7c at the other end of the strain body 7 and the longitudinal end edge 6e of the spacer 6 be aligned in the vertical direction, and the wide end edge 7c3 of the wide portion 7c and the inner end edge 9a1 of the stopper plate 9 be aligned in the vertical direction.

Further, the longitudinal end edges 6e of the spacers 6 and the inner end edges 9a1 of the stopper plate 9 are fixed so as to be substantially perpendicular (exactly perpendicular or almost perpendicular) to the extension direction of the narrow portion 7a of the strain body 7.

Also, the longitudinal end edge 6e of the spacer 6 and one inner end edge 9a1 of the stopper plate 9 on one end side of the strain body 7, and the longitudinal end edge 6e of the spacer 6 and the other inner end edge 9a1 of the stopper plate 9 on the other end side of the strain body 7 are disposed so as to be substantially parallel (exactly parallel or almost parallel) to each other.

As a result, as shown in FIG. 11B, the portion of the narrow portion 7a of the strain body 7 where the strain gauges 8 are mounted becomes a simple bending state where fixed parts on both sides are fixed ends. Therefore, it is possible to accurately measure a load applied to the load button 2 based on deformation of a simple bending of the narrow portion 7a of the strain body 7 by using the strain gauges 8.

Figure 12:
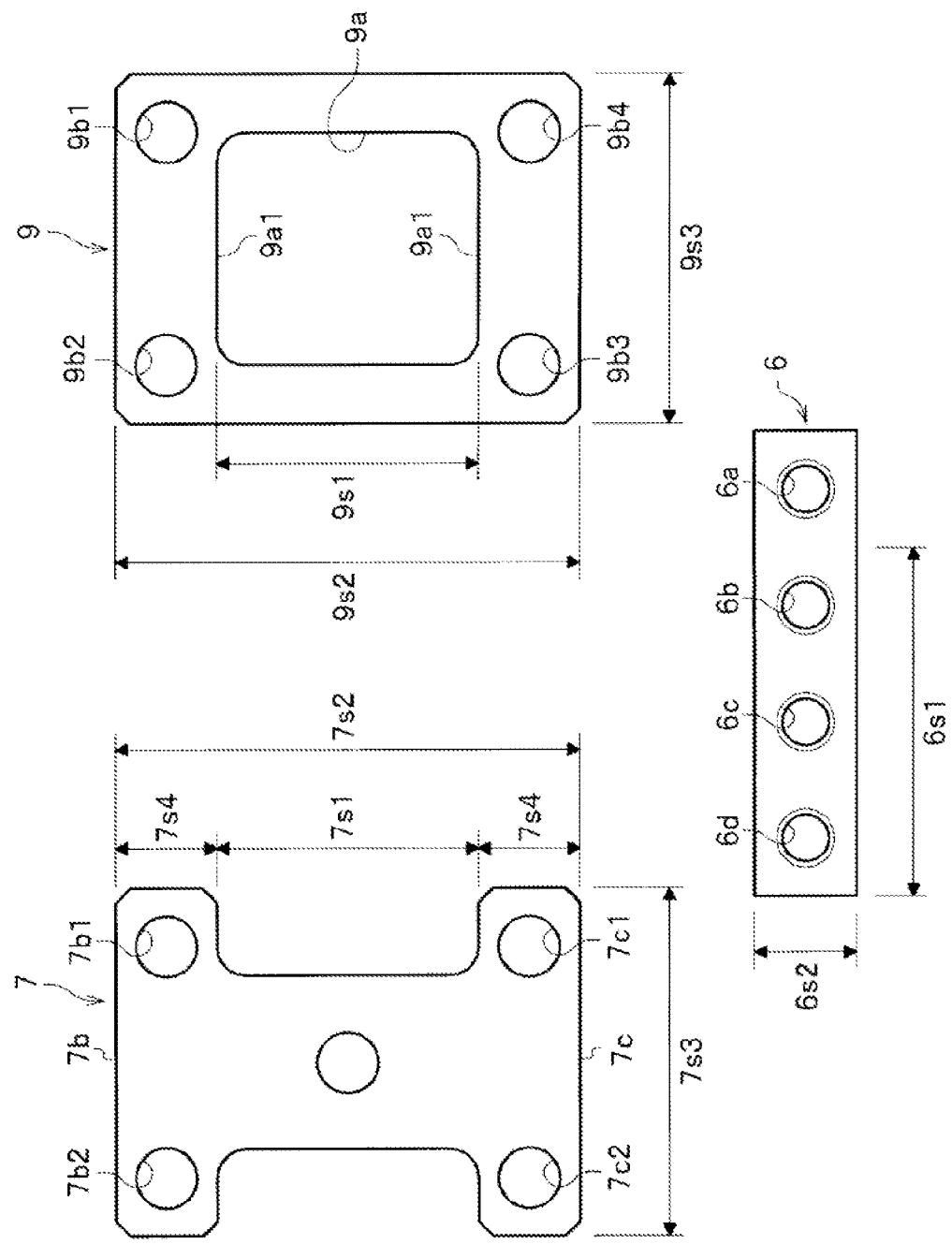
FIG. 12 is a plan view showing a preferable dimension relation of the strain body, the stopper plate and the spacer.

FIG. 12 is a plan view showing a preferable dimension relation of the strain body 7, the stopper plate 9 and the spacers 6.

In order for the narrow portion 7a of the strain body 7 to satisfy the condition of the simple bending of the fixed ends, it is preferable that in the dimension relation between the strain body 7 and the stopper plate 9, a dimension 7s1 of the strain body 7 be equal to or larger than a dimension 9s1 of the stopper plate 9. Also, it is preferable that dimensions 7s2 and 7s3 be equal to or smaller than dimensions 9s2 and 9s3 of the stopper plate 9, respectively.

Also, in order to satisfy the condition of the simple bending of the fixed ends, it is preferable that in the dimension relation between the strain body 7 and the spacers 6, the dimension 7s3 of the strain body 7 be equal to or smaller than a dimension 6s1 of a portion of the spacer 6 which the strain body 7 is in contact with and is fixed to, and a dimension 7s4 of the strain body 7 be equal to or smaller than a dimension 6s2 of the spacer 6.

<Use State of Small-Sized Load Sensor Unit>

Figure 13:
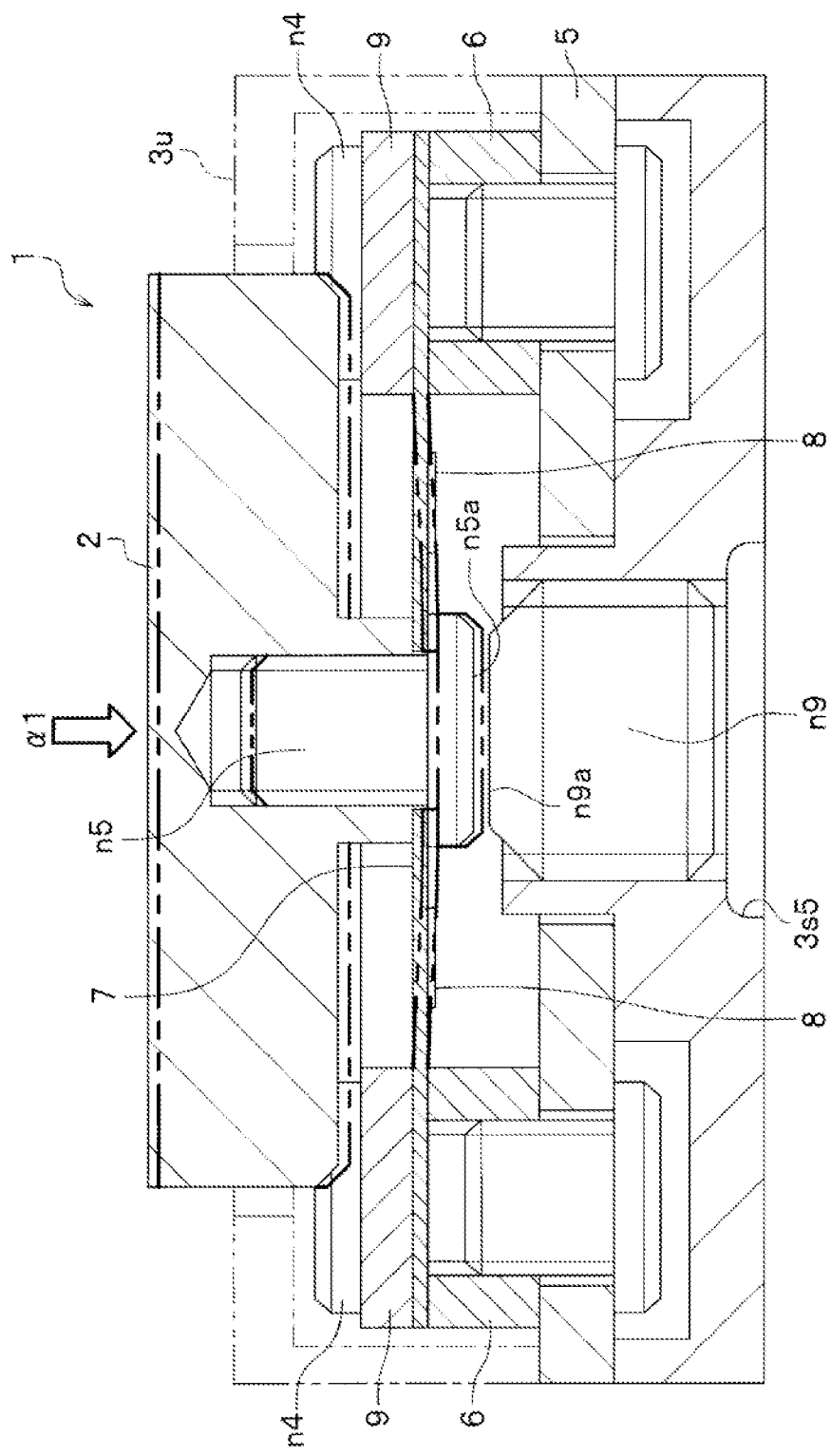
FIG. 13 is an enlarged view showing a cross section taken along the line B-B of FIG. 2A.

FIG. 13 is an enlarged view showing a cross section taken along the line B-B of FIG. 2A wherein thick alternate long and two short dashes lines show a case where a normal pressing force is applied to the load button 2.

When a pressing force (an arrow α1 of FIG. 13) is applied to the load button 2, the load button 2 moves as shown by a thick alternate long and two short dashes line, and the strain body 7 fixed to the load button 2 is bent (deformed) as shown by a thick alternate long and two short dashes line. As a result, the strain gauges 8 mounted on the strain body 7 expand, and resistance values of the strain gauges 8 configuring a bridge circuit vary. Therefore, the pressing force applied to the load button 2 is measured as an amount of change in current (a signal of a difference between an output signal of the external connection terminal 4b and an output signal of the external connection terminal 4c which is the ground (GND) terminal).

Figure 14:
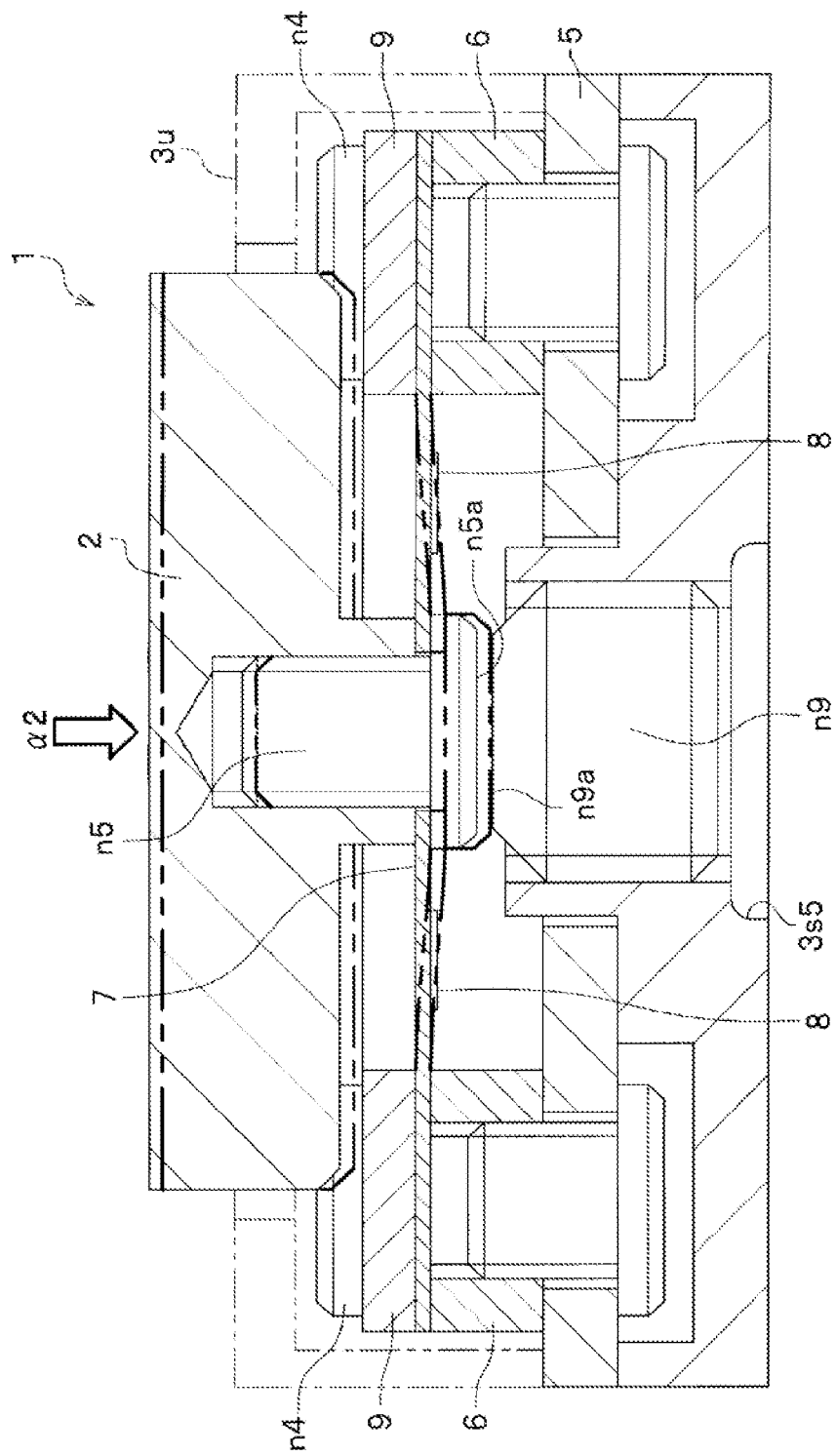
FIG. 14 is an enlarged view showing a cross section taken along the line B-B of FIG. 2A when the pressing force of an excessive load is applied to a center of the load button.

FIG. 14 is an enlarged view showing a cross section taken along the line B-B of FIG. 2A when the pressing force of an excessive load is applied to the center of the load button 2.

When a pressing force applied to the center portion of the load button 2 is an excessive load (see an arrow α2 of FIG. 14), the screw head n5a of the round head screw n5 fixing the strain body 7 and the load button 2 comes into contact with the front end edge n9a of the setscrew n9 which is a stopper, so that the movement of the load button 2 is stopped. As a result, when the pressing force applied to the center portion of the load button 2 is an excessive load, that pressing force is restricted. Therefore, it is possible to suppress or prevent damage of the small-sized load sensor unit 1.

Figure 15:
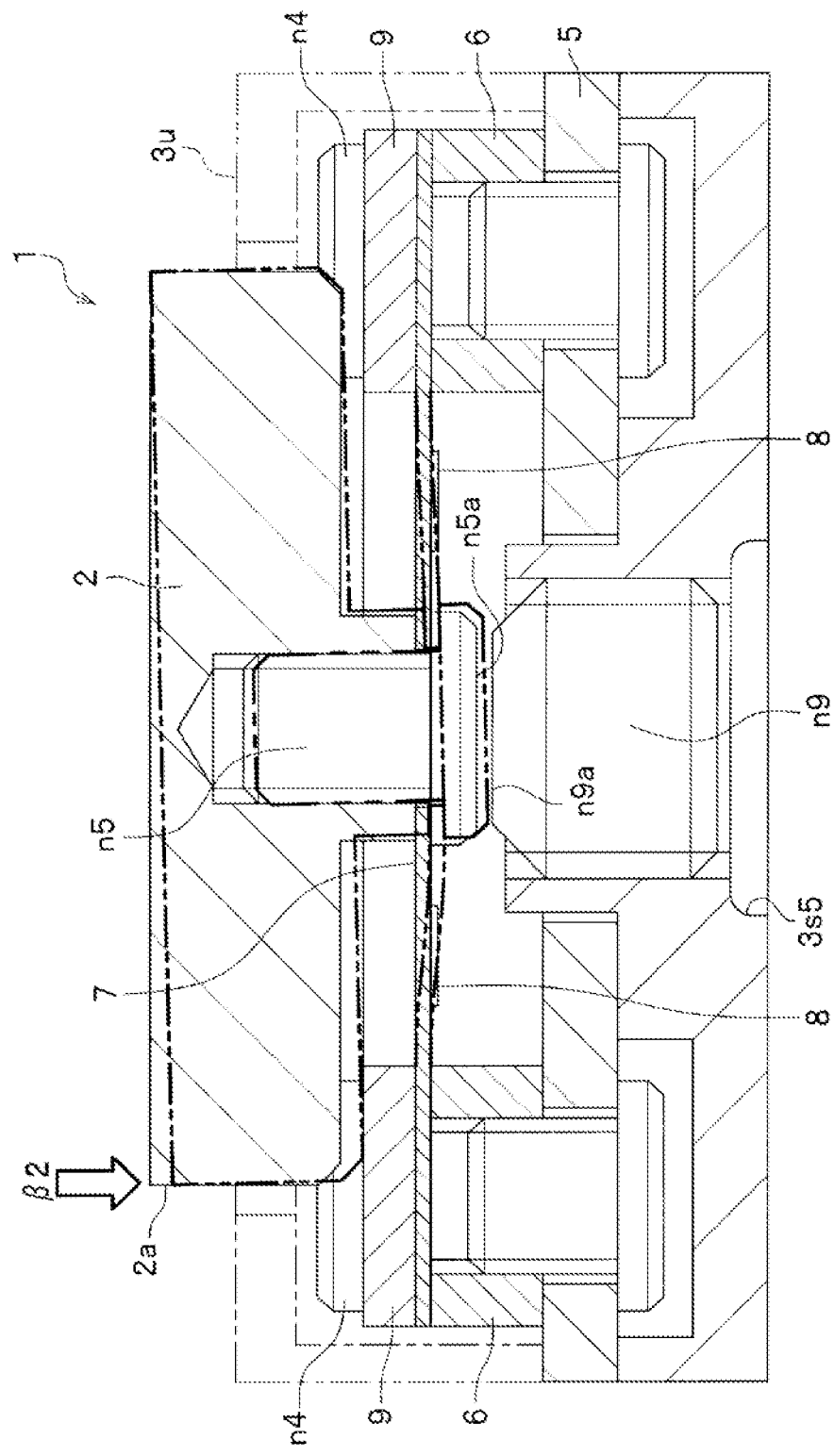
FIG. 15 is an enlarged view showing a cross section taken along the line B-B of FIG. 2A when the pressing force of an excessive load is applied to an edge portion of the load button.

FIG. 15 is an enlarged view showing a cross section taken along the line B-B of FIG. 2A when the pressing force of an excessive load is applied to an edge portion of the load button 2.

When an unbalanced large load (an arrow 12 of FIG. 15) is applied to the edge portion of the load button 2 of the small-sized load sensor unit 1 (an excessive load is applied) during maintenance, cleaning, or the like, the cylindrical portion 2a of a portion of the load button 2 comes into contact with the stopper plate 9, so that the movement of the load button 2 is stopped.

As described above, even if pressing forces of various excessive loads are applied to the load button 2, movement of the load button 2 is stopped by contact with the round head screw n5 or the stopper plate 9. Therefore, it is possible to suppress or prevent damage or breakage of the small-sized load sensor unit 1.

<Metallization of Components of Small-Sized Load Sensor Unit>

Figure 16A:
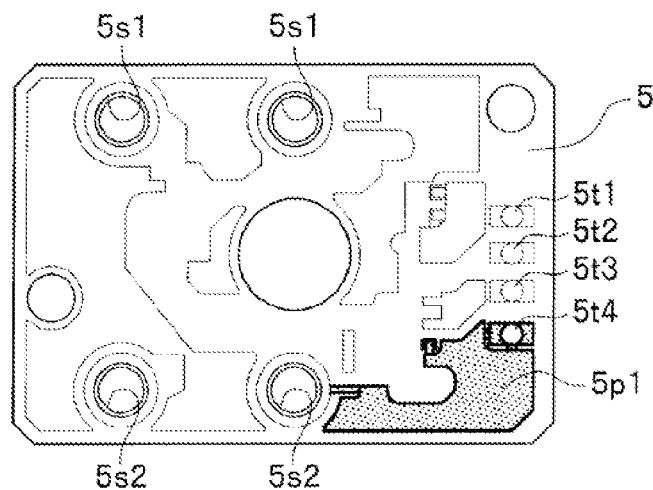
FIG. 16A is a plan view showing a base plate having an earth wiring pattern formed thereon.
Figure 16B:
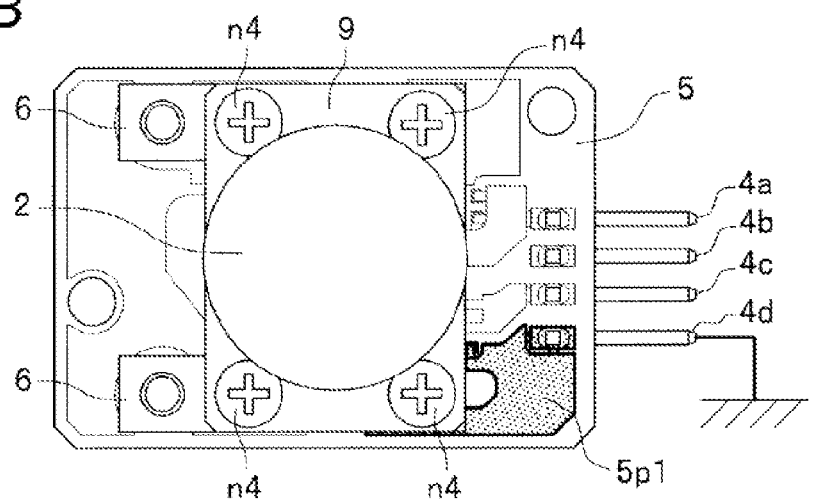
FIG. 16B is a conceptual view showing a state where an external connection terminal connected to the earth wiring pattern is connected to an external earth.
Figure 16C:
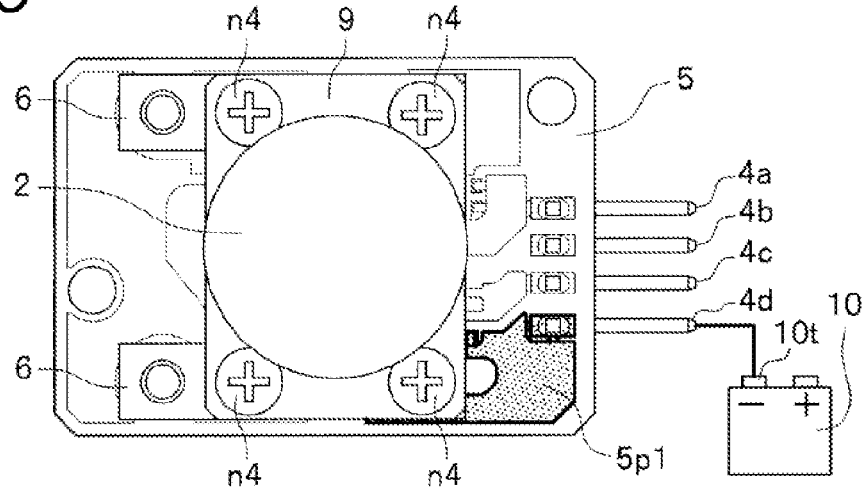
FIG. 16C is a conceptual view showing a state where the external connection terminal connected to the earth wiring pattern is connected to a negative terminal of a battery.

FIG. 16A is a plan view showing the base plate 5 having an earth wiring pattern 5p formed thereon, FIG. 16B is a conceptual view showing a state where the external connection terminal 4d connected to the earth wiring pattern 5p1 is connected to an external earth, and FIG. 16C is a conceptual view showing a state where the external connection terminal 4d connected to the earth wiring pattern 5p1 is connected to a negative terminal 10t of a battery 10.

In the above-described illustrative embodiment, a case where the load button 2, the cover 3u configuring the upper case and the support plate 3s configuring the lower case are formed of resin is exemplified. However, at least one of those members may be formed of a metal such as stainless steel (SUS). In this case, it is possible to enhance the strength of the small-sized load sensor unit 1 and improve the mechanical reliability of the small-sized load sensor unit 1.

Here, as shown in FIG. 2B, the load button 2 is fixed to the strain body 7 by the round head screw n5. Further, as shown in FIG. 2C, the strain body 7 is fixed together with the stopper plate 9 to the spacers 6 by the round head screws n4. The spacers 6 are fixed to the base plate 5 by the round head screws n3. That is, the spacers 6 are in contact with and fixed to the base plate 5.

The round head screws n5, n4, and n3 are formed of a metal such as steel, stainless steel, or brass. Therefore, the round head screws n5, n4, and n3 have electrical conductivity. Also, each of the strain body 7, the stopper plate 9, and the spacers 6 is a metal such as stainless steel or aluminum, and has electrical conductivity.

Further, since the spacers 6 are into contact with and fixed to the base plate 5, the load button 2 is electrically connected to portions of the base plate 5 being in contact with the spacers 6, through the round head screws n5, n4, and n3 which have electrical conductivity, or by contact of members which have electrical conductivity.

Therefore, if an earth wiring pattern 5p1 is formed on the base plate 5 so as to be able to contact with a spacer 6 as shown in FIG. 16A, it is possible to electrically connect the load button 2 to the earth wiring pattern 5p1 of the base plate 5.

Further, the earth wiring pattern 5p1 formed on the base plate 5 is electrically connected to the earth external connection terminal 4d.

Therefore, by connecting the external connection terminal 4d to the earth as shown in FIG. 16B, it is possible to cause noise due to metallization of the load button 2 to flow to the earth, and to prevent disturbance to electronic components of the base plate 5 from occurring when the load button 2 is formed of a metal which is a conductor.

Alternatively, by connecting the external connection terminal 4d to the negative terminal 10t of the battery 10 as shown in FIG. 16C, it is possible to cause noise due to metallization of the load button 2 to flow to the negative terminal 10t, and to prevent disturbance to electronic components of the base plate 5 from occurring when the load button 2 is formed of a metal which is a conductor.

Also, as shown in FIG. 2B, the cover 3u configuring the upper case is in contact with a contact portion 5o1 of a surface 5o of the base plate 5. Therefore, by forming the earth wiring pattern 5p1 on the base plate 5 so as to extend to the contact portion 5o1 of the base plate 5, it is possible to electrically connect the cover 3u and the external connection terminal 4d.

Therefore, by connecting the external connection terminal 4d to the earth as shown in FIG. 16B, it is possible to cause noise due to metallization of the cover 3u to flow to the earth, and to prevent disturbance to electronic components of the base plate 5 from occurring when the cover 3u is formed of a metal which has electrical conductivity.

Alternatively, by connecting the external connection terminal 4d to the negative terminal 10t of the battery 10 as shown in FIG. 16C, it is possible to cause noise due to metallization of the cover 3u to flow to the negative terminal 10t of the battery 10, and to prevent disturbance to electronic components of the base plate 5 from occurring when the cover 3u is formed of a metal which has electrical conductivity.

As shown in FIG. 2B, the support plate 3s configuring the lower case is in contact with a contact portion 5u1 of a rear surface 5u of the base plate 5. Therefore, by forming the earth wiring pattern 5p1 on the base plate 5 so as to extend to the contact portion 5u1, it is possible to electrically connect the support plate 3s and the external connection terminal 4d.

Therefore, by connecting the external connection terminal 4d to the earth as shown in FIG. 16B, it is possible to cause noise due to metallization of the support plate 3s to flow to the earth, and to prevent disturbance to electronic components of the base plate 5 from occurring when the support plate 3s is formed of a metal which has electrical conductivity.

Alternatively, by connecting the external connection terminal 4d to the negative terminal 10t of the battery 10 as shown in FIG. 16C, it is possible to cause noise due to metallization of the support plate 3s to flow to the negative terminal 10t of the battery 10, and to prevent disturbance to electronic components of the base plate 5 from occurring when the support plate 3s is formed of a metal which has electrical conductivity.

According to the small-sized load sensor unit 1 having the above-described configuration, since two stopper mechanisms (the setscrew n9 and the stopper plate 9) are provided for an excessive load applied to any portion of the entire surface of the load button 2 which is a load part of a sensor, it is possible to prevent damage or breakage of the small-sized load sensor unit 1.

In other words, the small-sized load sensor unit 1 has a stopper structure capable of preventing damage or breakage not only for an excessive load applied to the center portion of the load button 2 but also for an unbalanced excessive load deviated from the center of the load button 2.

Since the small-sized load sensor unit 1 may receive an excessive load at any part of the load button 2, the small-sized load sensor unit 1 is very useful.

<Infusion Pump Apparatus Having Small-Sized Load Sensor Unit>

Figure 17:
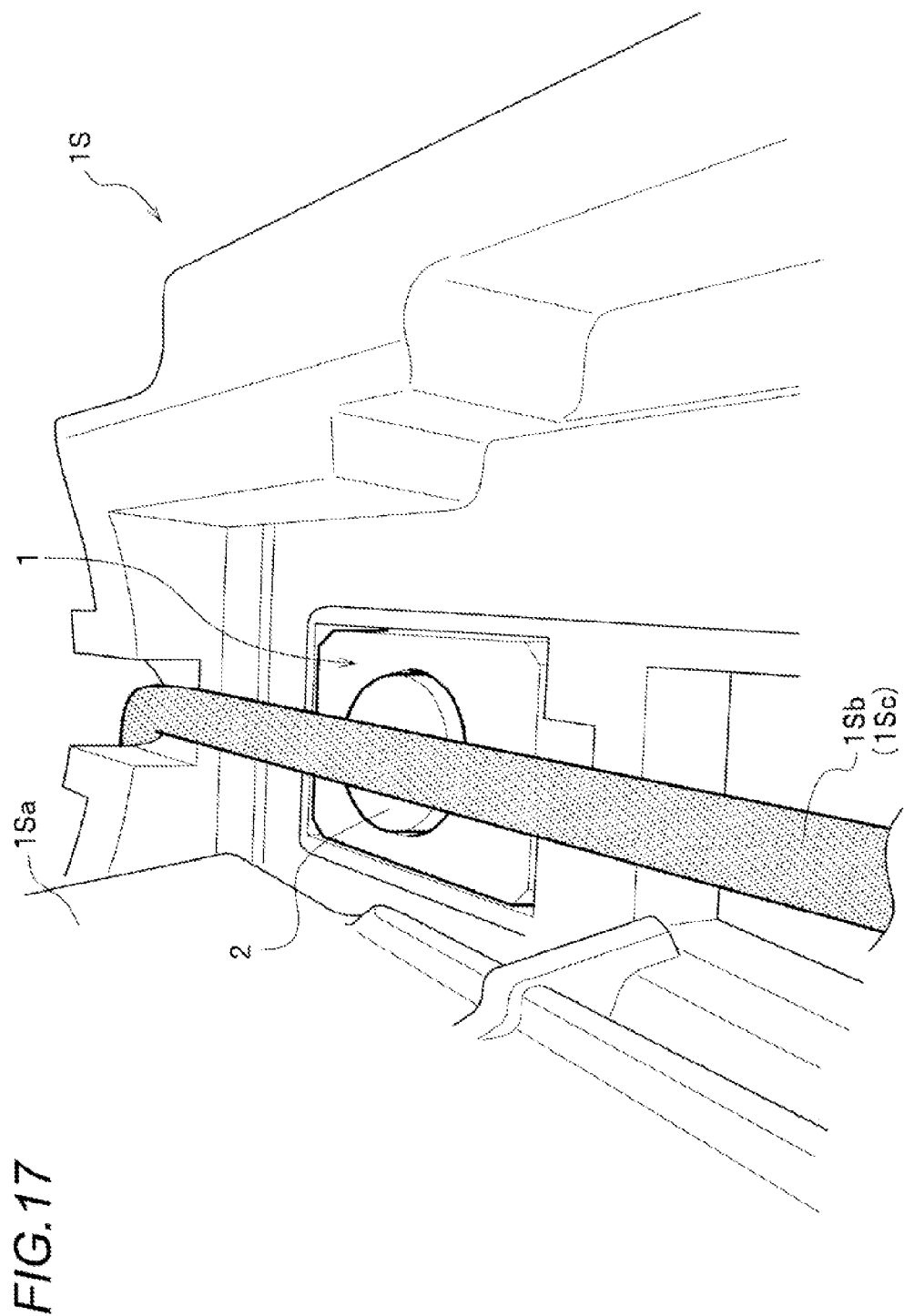
FIG. 17 is a perspective view showing a state where the small-sized load sensor unit is mounted on an infusion pump apparatus.

FIG. 17 is a perspective view showing a state where the small-sized load sensor unit 1 is mounted on an infusion pump apparatus 1S. In FIG. 17, a lid 1Sa of the infusion pump apparatus 1S is opened.

The infusion pump apparatus 1S is configured to eject a drug solution by an ejection pump (not shown), and measure a pressure of an infusion-side tube 1Sb and the pressure of an ejection-side tube 1Sc for managing an operation state thereof.

Here, in order to detect the pressure of each of the infusion-side tube 1Sb and the ejection-side tube 1Sc, the infusion-side tube 1Sb and the ejection-side tube 1Sc are set in the infusion pump apparatus 1S so as to pass on the almost center position of a sensor for detecting a pressure.

However, during cleaning or the like, a user may carelessly apply an excessive load to the sensor unit of the infusion pump apparatus 1S.

For this reason, a stopper for excessive loads regarding the pressures of the infusion-side tube 1Sb and the ejection-side tube 1Sc is necessary. However, during cleaning, maintenance, or the like of the infusion pump apparatus 1S, a load is not necessarily applied to the center portion of the load button 2, but an unbalanced load may be applied, resulting in breakage of the sensor. Therefore, even for unbalanced loads, a stopper for excessive loads is necessary.

For this reason, the above-described small-sized load sensor unit 1 includes two stopper mechanisms, that is, a first stopper (the setscrew n9) for pressing forces on the center portion, and a second stopper (the stopper plate 9) for unbalanced loads.

Therefore, the small-sized load sensor unit 1 can be set below the infusion-side tube 1Sb and the ejection-side tube 1Sc, and can be used to detect (measure) the pressure of the infusion-side tube 1Sb and the pressure of the ejection-side tube 1Sc. In the small-sized load sensor unit 1 for detecting the pressure of the infusion-side tube 1Sb and the pressure of the ejection-side tube 1Sc, the first stopper (the setscrew n9) operates for an excessive load, and the second stopper (the stopper plate 9) operates for an unbalanced load during cleaning, maintenance, or the like. Therefore, it is possible to prevent damage or breakage of the small-sized load sensor unit 1.

Therefore, it is possible to implement the small-sized load sensor unit 1 which serves as an occlusion sensor of the infusion pump apparatus 1S and has a double stopper function.

Therefore, it is possible to improve durability of the infusion pump apparatus 1S and improve the reliability.

<Syringe Pump Apparatus Having Small-Sized Load Sensor Unit>

Figure 18:
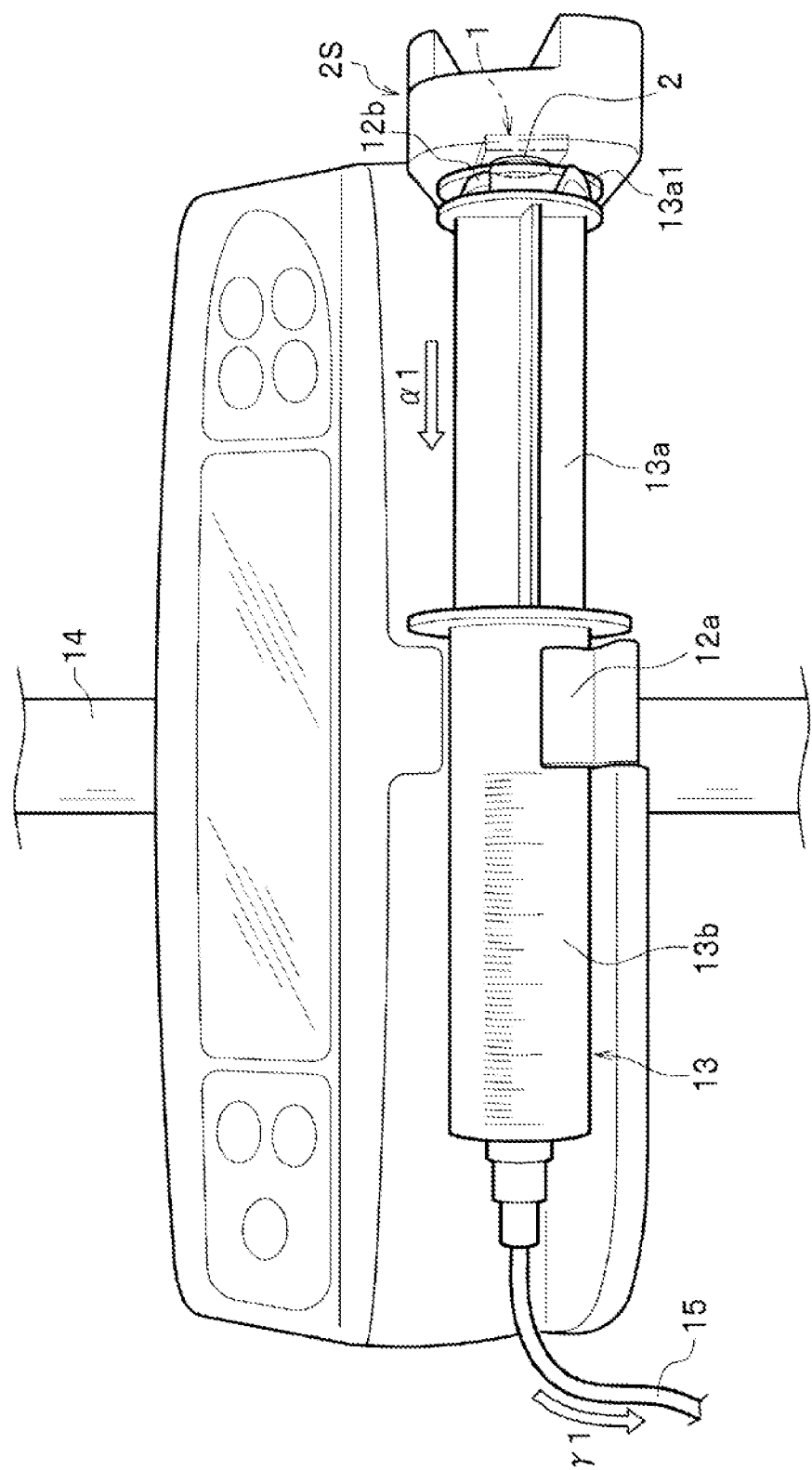
FIG. 18 is a perspective view showing a state where the small-sized load sensor unit is mounted on a syringe pump apparatus.

FIG. 18 is a perspective view showing a state where the small-sized load sensor unit 1 is mounted on a syringe pump apparatus 2S.

The syringe pump apparatus 2S is attached to a position of an infusion table 14 at the height of a patient (not shown).

A syringe 13 is fixed to a syringe holder 12a of the syringe pump apparatus 2S. Further, a flange 13a1 of an external cylinder 13a of the syringe 13 is fixed to a movable portion 12b of the syringe pump apparatus 2S.

In the movable portion 12b, the small-sized load sensor unit 1 is mounted so as to be able to recognize a load (the load of the movable portion 12b) applied to the flange 13a1 of the external cylinder 13a of the syringe 13 based on the pressing force on the load button 2.

The flange 13a1 of the external cylinder 13a of the syringe 13 is pressed by the movable portion 12b of the syringe pump apparatus 2S, so that a drug solution contained in an internal cylinder 13b of the syringe 13 passes through an extension tube 15 and is discharged (see an arrow γ1 of FIG. 18). At this time, a reaction force (a load) from the flange 13a1 of the external cylinder 13a of the syringe 13 is applied to the load button 2 of the small-sized load sensor unit 1. Therefore, it is possible to use the small-sized load sensor unit 1 to measure the load applied to the movable portion 12b of the syringe pump apparatus 2S.

As a result, it is possible to recognize the magnitude of the load applied to the syringe pump apparatus 2S. Therefore, it is possible to improve durability of the syringe pump apparatus 2S and improve reliability.

Other Illustrative Embodiments

1. In the above-described illustrative embodiment, the setscrew n9 is exemplified as a first restricting unit, and a configuration adjusted by the screw is exemplified. However, the position of the first restricting unit may be adjusted by an automatic machine or the like included in factory equipment and using a fluid pressure, without using the setscrew n9, and the first restricting unit may be fixed by an adhesive, or by a fixing member.

Alternatively, the position of the first restricting unit may be adjusted by a cam, and the cam may be fixed by an adhesive, or adjustment of the first restricting unit may be performed by means other than a screw.

However, it may be the preferable that the setscrew n9 be used as the first restricting unit such that the configuration is simple and adjustment work is easy.

2. In the above-described illustrative embodiment, as a strain measuring unit, the strain gauge is exemplified. However, the strain measuring unit may be any other elements such as piezo-electric devices (piezo-resistive elements) capable of measuring an applied force.

Although a variety of illustrative embodiments of the present invention have been described, a variety of changes and modifications are possible within the scope of the present invention. That is, the specific forms of the present invention can be appropriately and arbitrarily changed within the scope of the present invention.

What is claimed is:

1. A small-sized load sensor unit comprising:
a pressure member, to which a pressing force is applied;
a strain body which is fixed to the pressure member by a first fixing member;
a strain measuring unit which is provided on the strain body and is configured to be deformed together with the strain body when the pressing force is applied, and which is configured to measure a magnitude of the pressing force based on a deformation amount of the strain measuring unit;
an amplifying unit which is configured to amplify an output of the strain measuring unit;
a first restricting unit which is configured to restrict a pressing force applied to a substantially center portion of the pressure member such that the pressing force becomes a predetermined threshold value or less; and
a second restricting unit which is configured to restrict the pressure member from moving by a predetermined amount or more when a pressing force of an excessive load is applied to an edge portion of the pressure member.

2. The small-sized load sensor unit according to claim 1, wherein a distance between the first restricting unit and the pressure member is adjusted such that when a pressing force exceeding the predetermined threshold value is applied to the pressure member, the first fixing member comes into contact with the first restricting unit so as to restrict the pressing force.

3. The small-sized load sensor unit according to claim 1, wherein the second restricting unit is provided on the strain body at a side where the pressure member is provided, and the portion of the pressure member is configured to come into contact with the second restricting unit so as to restrict the pressure member from moving by the predetermined amount or more.

4. The small-sized load sensor unit according to claim 1, wherein the pressure member has a cylindrical portion and a cuboidal boss portion,
wherein the cuboidal boss portion has a pair of linear edge portions and a pair of curved edge portions,
wherein the strain body is in contact with the cuboidal boss portion and is fixed to the pressure member by the first fixing member, and
wherein the strain measuring unit is provided at an outer side of the linear edge portions of the cuboidal boss portion.

5. The small-sized load sensor unit according to claim 4, wherein both end portions of the strain body are fixed by fixing portions, respectively.

6. The small-sized load sensor unit according to claim 5, wherein a distance between wide end edges of wide portions of the strain body is equal to or larger than a distance between inner end edges of the second restricting unit.

7. The small-sized load sensor unit according to claim 6, wherein a bottom of the cuboidal boss portion has an area equal to or larger than an area facing to contact with the strain body in the cuboidal boss portion.

8. The small-sized load sensor unit according claim 1, further comprising:
an upper case and a lower case configure an external appearance; and
a base plate which includes a wiring line for connecting to the strain measuring unit,
wherein at least one member among the upper case, the lower case, and the pressure member is formed of a metal,
wherein the base plate is formed with an earth wiring pattern for the at least one member formed of the metal, and
wherein the at least one member formed of the metal and the earth wiring pattern formed on the base plate are electrically connected to each other by contact with a second fixing member which has electrical conductivity.

9. The small-sized load sensor unit according to claim 1, wherein the strain measuring unit includes a strain gauge.

* * * * *